J. V. ROBINSON.
PIPE COUPLING.
APPLICATION FILED MAY 8, 1913.

1,217,505.

Patented Feb. 27, 1917.

Witnesses
L. A. Brooks
N. M. Spangler

Inventor
Jos. V. Robinson
J. T. Watson, Attorney

UNITED STATES PATENT OFFICE.

JOSEPH V. ROBINSON, OF CHEVY CHASE, MARYLAND.

PIPE-COUPLING.

1,217,505.   Specification of Letters Patent.   Patented Feb. 27, 1917.

Application filed May 8, 1913. Serial No. 766,418.

*To all whom it may concern:*

Be it known that I, JOSEPH V. ROBINSON, a citizen of the United States, residing at Chevy Chase, Maryland, have invented certain new and useful Improvements in Pipe-Couplings, of which the following is a specification.

My invention relates to pipe couplings for connecting together air and steam hose between railway cars and it consists in the combinations, arrangements and constructions hereinafter described and claimed.

An object of the invention is to produce a simple and powerful lock for positively and adjustably locking two pipe couplings tightly together thereby preventing accidental opening up of the couplings in going around sharp curves, and insuring a tight and secure joint under all conditions of service.

In the accompanying drawings in which like reference characters indicate corresponding parts in the several views.

Figure 1:
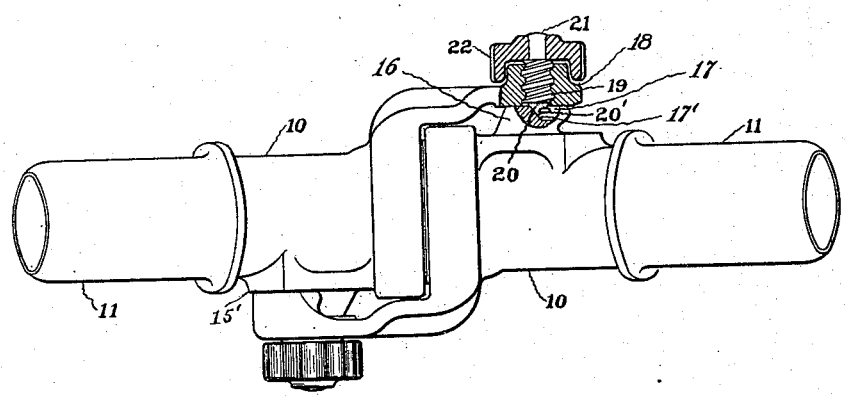
Figure 1, is a top plan view of a coupling provided with my improved locks, one of the locks being shown partly in section.

Referring more particularly to the drawings;

Each of the pair of members constituting the coupling comprises a hollow body 10, provided with a shank 11, for receiving a hose or pipe, and has also a joint face 12 lying in a plane transverse of the longitudinal axis of the body 10 and carrying a suitable gasket 13 adapted to adjust itself to any relative movement, between connected coupling members, occuring in service.

An arm 14 integral with the body 10 extends forwardly of the face 12, and in a plane approximately at right angles to the plane of said face and lies entirely in the vertical plane. The arm is provided with an undercut lip 15 for engaging a similarly undercut lug 16 arranged on the adjoining side of the body 10 of the opposite member, said lug having a notch 17 in its lower side and said lip being adapted to bear against a flat portion 15' at the side of said body and lying entirely in the vertical plane, from which said portion the lug 16 projects. At a point below the lip 15 the arm carries a threaded boss 18 in which is arranged a manually operated locking device or screw 19, having a steep-pitch thread. The screw or lock 19 is preferably made of a strong non-corrodible material and terminates at one end in a tapered point 20 for engaging the lug 16 at the notch 17, having an inclined surface 17'. At the other end the screw 19 has a flat-sided head 21 on which a head or wheel 22, for rotating the screw 19, is rigidly secured, as by forcing or by riveting it on.

From the drawing it will be seen that the undercut lips 15, lugs 16 and locking devices 19 of two engaged couplings are so related that by turning the locking devices pressure will be exerted in the direction of the length of the pipes to draw or force the coupling faces toward each other.

Figure 2:
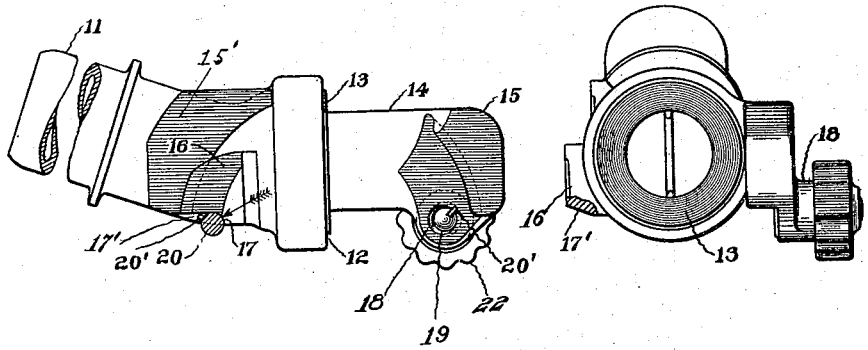
Fig. 2, is a side elevation of one of the coupling members.
Figure 3:
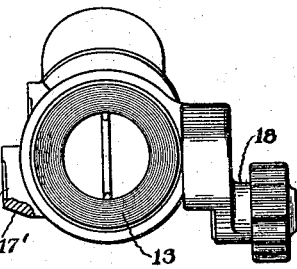
Fig. 3, is an end view thereof.

In operation, the coupling members are connected in the usual way, which brings the locking device of each member into alinement with the notch 17 of the other or mating member. The locking device is then rotated to force the point 20 into engagement with the surface 17' of the notch 17 and draws the two coupling members tightly together. During this operation, the movement of the screw 19 is inward and the pulling or clamping force exerted thereby is forward and downward relative to the coupling by which it is carried, as indicated by the arrow in Fig. 2. The movement of the screw 19 axially is limited by a pin 20', which is in the path of the threads of the screw, and by the nut 22, and the screw is held against rotation by the frictional contact of the point 20 with the lug 16.

To unhook coupled members, the locking device is turned back to normal position and the members tilted relatively, in the usual manner of the present form of couplings.

It will thus be seen that by a simple means I have produced a highly effective and powerful positive lock which will securely hold the coupling members locked together under all conditions of service and by which the clamping pressure on the members may be varied by tightening up or releasing the locking device. The forward pull of the lock on the member by which it is carried insures a tight joint between members which are badly worn at the undercut lip 15 and the lug 16. Such clamping effect of the lock is improved by moving its point of contact with the mating member to a point about the center of such member so as to lessen the downward pull of the lock.

While I have shown the best embodiment of my invention that I know of, changes may be made therein without departing from its scope and spirit.

What I claim as new and desire to secure by Letters Patent is:

1. A train pipe coupling member comprising a body having a coupling face adapted to make a butt joint with the corresponding face of a mating member, an arm extending from the body beyond said coupling face in a plane substantially at right angles to the plane of said face and provided on its inner surface with an under cut lip, an under cut lug on the body in rear of the coupling face adapted to be engaged by the under cut lip of a mating member, and a manually adjustable locking member having threaded engagement with said arm and adapted to exert pressure directly in the direction of the length of the body upon the lug of a mating member, substantially as and for the purpose described.

2. A train pipe coupling member comprising a body having a coupling face adapted to make a butt joint with the corresponding face of a mating member, an arm extending from the body beyond said coupling face in a plane substantially at right angles to the plane of said face and provided on its inner surface with an under cut lip, an under cut lug on the body in rear of the coupling face, adapted to be engaged by the under cut lip of a mating member, and provided with an auxiliary cam surface, and a manually adjustable locking member having a threaded engagement in said arm and adapted to exert pressure directly against the auxiliary cam surface of the lug of a mating member to maintain contact between the coupling faces of the mating members.

3. A train pipe coupling member comprising a body having a coupling face adapted to make a butt joint with the corresponding face of a mating member, an arm arranged in a plane substantially at right angles to the plane of said coupling face and projecting beyond said face, an under cut lip on said arm, an under cut lug on the body in rear of the coupling face adapted to be engaged by the under cut lip of a mating member, said lug having a notch or socket formed therein, and a locking screw mounted on the arm and adapted to enter the socket in the lug of a mating member and contact with the wall thereof adjacent the coupling face to maintain contact between the coupling faces of two mating members.

4. In a pipe coupling, the combination of a pair of coupling members each comprising a body having a coupling face and an arm extending from the body and said coupling face and substantially at right angles to the plane thereof, an under cut lip on each of said arms, under cut lugs on each body with which said lips engage when the coupling faces are in contacting relation, and a manually adjustable screw mounted in each of the arms and engaging the under cut lugs to directly exert pressure thereon in the direction of the length of the bodies, substantially as and for the purpose described.

In testimony whereof I affix my signature in presence of two witnesses.

JOSEPH V. ROBINSON.

Witnesses:
M. C. SHERIDAN,
J. L. HENNING.

Copies of this patent may be obtained for five cents each, by addressing the "Commissioner of Patents, Washington, D. C."